US010970322B2

(12) United States Patent
Filoti et al.

(10) Patent No.: US 10,970,322 B2
(45) Date of Patent: Apr. 6, 2021

(54) TRAINING AN ARTIFICIAL INTELLIGENCE TO GENERATE AN ANSWER TO A QUERY BASED ON AN ANSWER TABLE PATTERN

(71) Applicant: International Business Machines Corporation, Armonk, NY (US)

(72) Inventors: Octavian F. Filoti, Portsmouth, NH (US); Chengmin Ding, Chantilly, VA (US); Stanley J. Vernier, Grove City, OH (US); Elinna Shek, Aldie, VA (US); Renee F. Decker, Brunswick, MD (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 16/199,651

(22) Filed: Nov. 26, 2018

(65) Prior Publication Data

US 2020/0167427 A1 May 28, 2020

(51) Int. Cl.
*G06F 16/00* (2019.01)
*G06F 16/332* (2019.01)
*G06N 3/08* (2006.01)
*G10L 15/16* (2006.01)
*G10L 15/06* (2013.01)
*G10L 15/22* (2006.01)

(52) U.S. Cl.
CPC ...... *G06F 16/3329* (2019.01); *G06F 16/3325* (2019.01); *G06N 3/08* (2013.01); *G10L 15/063* (2013.01); *G10L 15/16* (2013.01); *G10L 15/22* (2013.01); *G10L 2015/225* (2013.01)

(58) Field of Classification Search
CPC ... G06F 16/3329; G06F 16/325; G10L 15/16; G10L 15/063; G06N 3/08
See application file for complete search history.

(56) References Cited

U.S. PATENT DOCUMENTS

| 6,766,320 | B1 * | 7/2004 | Wang | G06F 16/313 |
| 9,330,084 | B1 * | 5/2016 | Kadambi | G06F 40/56 |
| 9,483,731 | B2 * | 11/2016 | Bagchi | G06F 16/3329 |
| 9,542,447 | B1 * | 1/2017 | Brennan | G06F 16/243 |
| 9,569,487 | B1 * | 2/2017 | Carroll | G06F 16/245 |

(Continued)

OTHER PUBLICATIONS

Dalton et al., Entity Query Feature Expansion using Knowledge Based Links, Jul. 6-11, 2014, ACM, pp. 365-374.*

(Continued)

*Primary Examiner* — Leslie Wong
(74) *Attorney, Agent, or Firm* — Law Office of Jim Boice (57) ABSTRACT

A method trains an artificial intelligence system to respond to a complex query. A query/answer (Q/A) system sends a first query to an information server, where the first query is a query about a first topic with regard to a first entity, and where the information server provides access to unstructured information sources. In response to receiving a negative response to the first query for the first entity, the Q/A system sends variations of the first query and a second query about a second topic to the information server. The Q/A system identifies a pattern in the table of information in order to create the answer to the first query for the first entity. The Q/A system then trains an artificial intelligence system to respond to a complex query about the first entity with information in the table of information.

20 Claims, 7 Drawing Sheets

(56) References Cited

U.S. PATENT DOCUMENTS

| | | |
|---|---|---|
| 10,229,188 B2 * | 3/2019 | Cortis .................. G06F 16/334 |
| 10,366,166 B2 * | 7/2019 | Yu ........................ G06N 3/0445 |
| 2015/0074112 A1 | 3/2015 | Liu et al. |
| 2016/0180242 A1 * | 6/2016 | Byron .................... G06N 5/041 |
| | | 706/11 |
| 2017/0242915 A1 * | 8/2017 | Torisawa ................ G06F 16/00 |
| 2017/0371955 A1 * | 12/2017 | Allen .................... G06F 16/313 |
| 2018/0157960 A1 * | 6/2018 | Holmes ............. G06F 16/24522 |
| 2018/0157990 A1 * | 6/2018 | Allen .................. G06F 16/9535 |
| 2019/0115008 A1 * | 4/2019 | Jiang ....................... G10L 15/22 |
| 2019/0122236 A1 * | 4/2019 | Terry ...................... G06N 5/02 |

OTHER PUBLICATIONS

Dhingra et al., Differentiable Reasoning over a Virtual Knowledge Base, Feb. 25, 2020, ICLR, pp. 1-16.*

P. Mell et al., "The Nist Definition of Cloud Computing", National Institute of Standards and Technology, Information Technology Laboratory, Sep. 2011, pp. 1-7.

B. Yue et al., "An Effective Framework for Question Answering Over Freebase via Reconstructing Natural Sequences", IW3C2, WWW'17 Companion, Apr. 2017, pp. 865-866.

X. Yao et al, "Information Extraction Over Structured Data: Question Answering With Freebase", Proceedings of the 52nd Annual Meeting of the Association for Computational Linguistics, vol. 1, Jun. 2014, pp. 1-11.

H. Alani et al., "Automatic Ontology-Based Knowledge Extraction and Tailored Biography Generation From the Web", IEEE, IEEE Intelligent Systems, vol. 18. No. 1, Jan.-Feb. 2003, pp. 1-12.

* cited by examiner

TRAINING AN ARTIFICIAL INTELLIGENCE TO GENERATE AN ANSWER TO A QUERY BASED ON AN ANSWER TABLE PATTERN

BACKGROUND

The present invention relates to the field of artificial intelligence. Still more specifically, the present invention relates to the field of training artificial intelligence to generate a query answer based on a pattern in a query answer table.

SUMMARY

In an embodiment of the present invention, a method trains an artificial intelligence system to respond to a complex query. A query/answer (Q/A) system sends a first query to an information server, where the first query is a query about a first topic with regard to a first entity, and where the information server provides access to unstructured information sources. The Q/A system receives a negative response to the first query for the first entity, where the negative response indicates that the unstructured information sources do not explicitly contain an answer to the first query for the first entity. In response to receiving the negative response to the first query for the first entity, the Q/A system: sends variations of the first query to the information server, where the variations of the first query are about the first topic but with regard to other entities, and where the other entities do not include the first entity; and sends a second query to the information server, where the second query is about a second topic regarding both the first entity and the other entities. The Q/A system receives, from the information server, responses to the variations of the first query and responses to the second query, and generates a table of information from the responses to the variations of the first query and the responses to the second query. The Q/A system identifies a pattern in the table of information between the responses to the variations of the first query and the responses to the second query for the other entities, and creates the answer to the first query for the first entity based on the pattern in the table of information between the responses to the variations of the first query and the responses to the second query for the other entities. The Q/A system then populates the table of information with the answer to the first query. The Q/A system (and/or other processors, computers, persons, etc.) then trains an artificial intelligence system to respond to a complex query about the first entity with information in the table of information that is populated with the answer to the first query, where the complex query requests responses to multiple queries about the first entity.

In an embodiment of the present invention, processor(s) activate, modify, change a functionality of, and/or otherwise affect a hardware device based on the answer that is generated by the AI system.

In one or more embodiments, the method(s) described herein are performed by an execution of a computer program product and/or a computer system.

DETAILED DESCRIPTION

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

Figure 1:
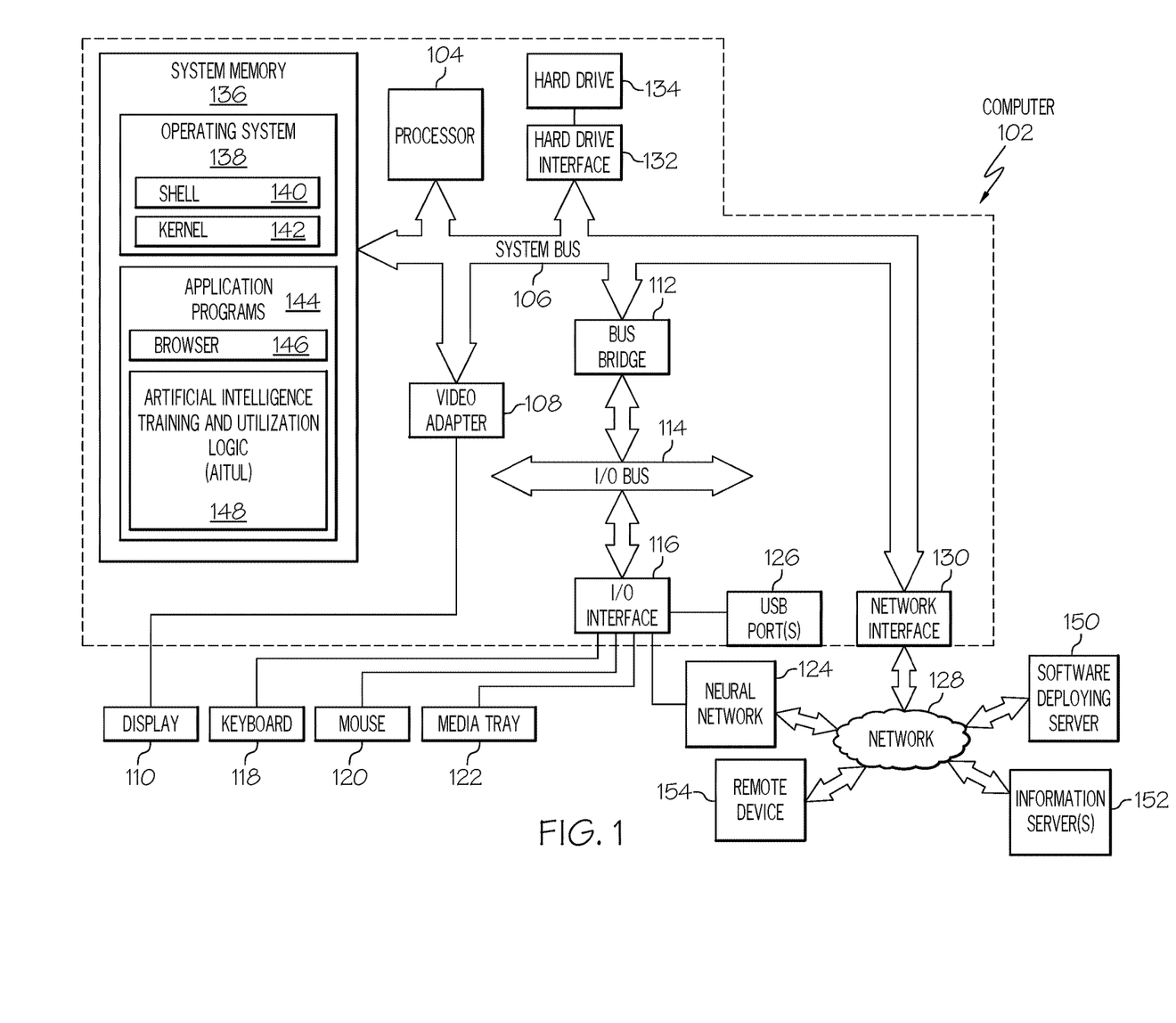
FIG. 1 depicts an exemplary system and network in which the present invention is implemented in various embodiments.

With reference now to the figures, and in particular to FIG. 1, there is depicted a block diagram of an exemplary system and network that can be utilized by and/or in the implementation of the present invention. Note that some or all of the exemplary architecture, including both depicted hardware and software, shown for and within computer 102 can be utilized by software deploying server 150 and/or information server(s) 152 and/or remote device 154 and/or neural network 124.

Exemplary computer 102 includes a processor 104 that is coupled to a system bus 106. Processor 104 can utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which can include storage devices such as CD-ROM drives, multi-media interfaces, etc.), a neural network 124, and external USB port(s) 126. While the format of the ports connected to I/O interface 116 can be any known to those skilled in the art of computer architecture, in one embodiment some or all of these ports are universal serial bus (USB) ports.

As depicted, computer 102 is able to communicate with a software deploying server 150 and/or the information server(s) 152 and/or the remote device 154 and/or the neural network 124 using a network interface 130 to a network 128. Network interface 130 is a hardware network interface, such as a network interface card (NIC), etc. Network 128 can be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Artificial Intelligence Training and Utilization Logic (AITUL) 148. AITUL 148 includes code for implementing the processes described below, including those described in FIGS. 2-5. In one embodiment, computer 102 is able to download AITUL 148 from software deploying server 150, including in an on-demand basis, wherein the code in AITUL 148 is not downloaded until needed for execution. Note further that, in one embodiment of the present invention, software deploying server 150 performs all of the functions associated with the present invention (including execution of AITUL 148), thus freeing computer 102 from having to use its own internal computing resources to execute AITUL 148.

Also connected to (or alternatively, as part of) computer 102 is a neural network 124. In exemplary embodiments of the present invention, neural network 124 is a non-convolutional neural network (see FIG. 4), a convolutional neural network, or another type of heuristic artificial intelligence.

Figure 2:
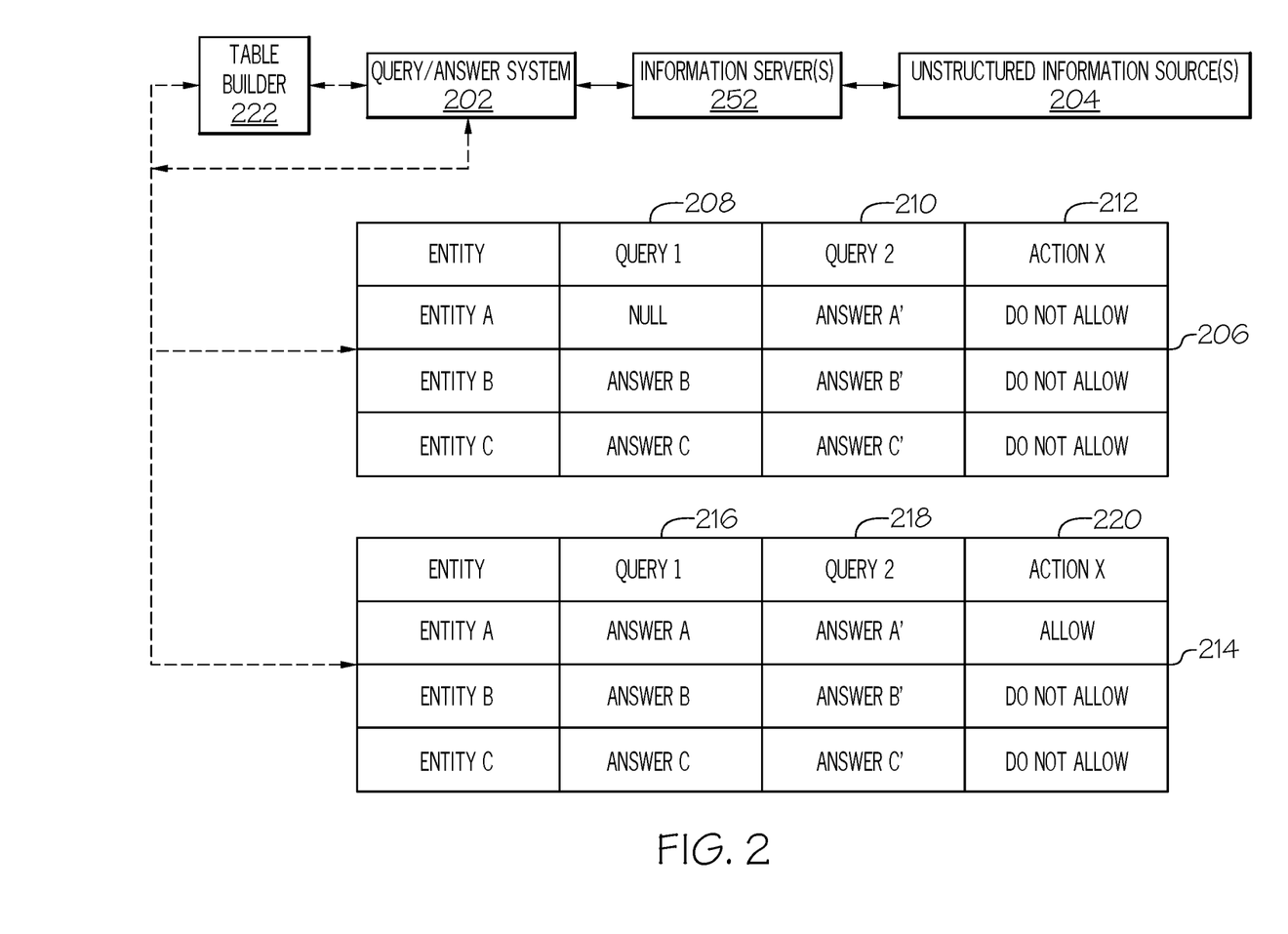
FIG. 2 illustrates an overview of a query/answer system utilizing both unstructured information sources and database tables in accordance with one or more embodiments of the present invention.

Also connected to computer 102 are information server(s) 152, which are used by a query/answer system to retrieve unstructured information, as depicted in the example shown in FIG. 2.

Also connected to computer 102 is a remote device 154. One or more examples of remote device 154 are presented below.

Note that the hardware elements depicted in computer 102 are not intended to be exhaustive, but rather are representative to highlight essential components required by the present invention. For instance, computer 102 can include alternate memory storage devices such as magnetic cassettes, digital versatile disks (DVDs), Bernoulli cartridges, and the like. These and other variations are intended to be within the spirit and scope of the present invention.

One or more embodiments of the present invention use one or more of the following components, as described and/or defined below.

A query answering (Q/A) system is defined as a system that mines unstructured information sources to answer a query/question.

A structured answering domain (SAD) Q/A system is defined as a Q/A system configured to input N queries to a Q/A system, receive N answers to the N queries from the Q/A system, and output N (Query, Answer) pairs from the Q/A system in order to create a SAD Q/A system knowledge base, such as a table.

N (Query, Answer) pairs are thus defined as the output of the SAD Q/A system.

A SAD Q/A system knowledge base is a structured set of the output N (Query, Answer) that is output from the Q/A system. The SAD Q/A system knowledge base is part of the SAD Q/A system, and contains a table representation or other structured data representations of the output N (Query, Answer) using annotations schema. In an embodiment in which the SAD Q/A system knowledge base is a table, the table uses a table annotation schema for table annotations in the table.

Table annotations are defined as entries into the SAD Q/A system knowledge base.

A table builder is defined as a natural language processing (NLP) engine that builds table annotations (e.g., data entries in the cells of a table) for each N (Query, Answer) pair, based on a provided table annotations schema, and informs the SAD Q/A system knowledge base which table the (Query, Answer) pairs will go to (i.e. passes the TableID field) to the table builder. In an embodiment of the present invention, the SAD Q/A system is the table builder.

A table annotations schema is a schema used by cells in a table, and includes row/table headers, relationships to other cells, a TableID field which the table annotations (e.g., cell data entries) go to. In an embodiment of the present invention, there is one table annotations schema for each set of N (Query, Answer) pairs.

A SAD Q/A system pipeline is defined as a sequence of functional units (processing engines) that perform a task in several steps or stages in order to provide an answer to a query using the SAD Q/A system knowledge base.

As described herein, one or more embodiments of the present invention utilizes a structured answering domain (SAD) querying answer (Q/A) system to generate an information table, which is then used to answer queries that the Q/A system is unable to answer from unstructured information sources. That is, a Q/A system first queries unstructured information source(s) for an explicit answer to a specific query about a first entity. If the unstructured information source(s) do not contain an explicit answer to the explicit query about the first entity, then the Q/A system builds a structured knowledge base of answers to related queries about other entities, in order to identify a pattern, which is used to generate the explicit answer to the explicit query about the first entity.

Thus, one or more embodiments of the present invention use a query answering (Q/A) system to structure information from massive text data. That is, one or more embodiments of the present invention create a framework for using a query answering (Q/A) system to transform unstructured raw text into structured tables. As a result, the present invention consolidates knowledge and enables the discovery of facts that are not present in the Q/A system's knowledge base (KB).

As described herein, the system uses the query answering (Q/A) system to input queries and collect their answers, which in turn are sent to a table builder, which builds table annotations. For each table, identified by a unique TableID field, these table annotations are stored in the Q/A system's knowledge base (KB), which in various embodiments is a search index, a relational database, a table, and/or a combination thereof.

In one or more embodiments, the table builder uses a natural language processing (NLP) engine to build table annotations for each (Query, Answer) pair, based on the provided table annotations schema, and then stores the (Query, Answer) pairs in the Q/A system's knowledge base. Each set of N (Query, Answer) pairs has a corresponding Table Annotations Schema.

Thus, the present invention enables Q/A systems to structure previously unstructured text information (raw text) into tables by using a structured answering domain framework, in order to build tables from which answers are developed and extracted, thus expanding the knowledge domain for Q/A systems.

As such, the present invention performs automatic knowledge consolidation by structuring text information in a manner that patterns are generated for other queries that are related to an initial specific first query, in order to generate a specific answer for the specific first query.

As described herein, the present invention provides a new and useful system over the prior art for expanding knowledge by consolidating information; organizing information by structuring text data; and providing the ability to discover facts based on patterns in a knowledge base.

With reference now to FIG. 2, an overview of a query/answer system utilizing both unstructured information sources and database tables in accordance with one or more embodiments of the present invention is presented.

In an exemplary embodiment, query/answer (Q/A) system 202 (analogous to computer 102 shown in FIG. 1) is a system that is able to extract data from unstructured information source(s) 204 via information server(s) 252 (analogous to information server(s) 152 shown in FIG. 1). As described herein, Q/A system 202 is also able to extract data from structured answering domain (SAD) Q/A system knowledge base 214, either directly or via a table builder 222.

An exemplary Q/A system 202 answers explicit queries. For example, if a user enters a query such as "Who resides in property A?", the Q/A system 202 will send this query to information server(s) 252, which will use natural language processing (NLP) to identify the meaning and context of the query by creating tags for, extracting key words of, etc. the query. The information server(s) 252 then sends these tags, key words, etc. to unstructured information source(s) 204, which are text documents, databases, etc. If there is an exact match between the key words in the query ("Who" and "resides" and "property A") and key words in a document/text/information from the unstructured information source(s) 204 ("Who" and "resides" and "property A"), and the key words in a document/text/information from the unstructured information source(s) 204 also includes the tagged data "Entity A", then the query will be answered with the answer "Entity A resides at property A".

However, the unstructured information source(s) 204 might not include any text/data/etc. that include all of the key words "Who" and "resides" and "property A". However, the Q/A system 202 has been trained (e.g., using a neural network —see FIG. 4 below) to associate the term/concept "resides" with "purchased". That is, the Q/A system 202 has been trained to associate the term/concept of property being "purchased" as being a precursor/precondition to the term/concept of "resides" when dealing with home ownership and residence therein.

In this scenario, the Q/A system 202 directs a table builder 222 (which in an embodiment is part of the Q/A system 202 while in another embodiment is an independent standalone system) to construct a Q/A system knowledge base 206 of answers to the queries "Who resides at property A?" (Query 1 in column 208 in the Q/A system knowledge base 206) and "Who purchased property A?" (Query 2 in column 210 in the Q/A system knowledge base 206).

As shown in FIG. 2, the Q/A system knowledge base 206 includes no answer for Entity A to Query 1 ("Who resides at . . . ?"). However, the Q/A system knowledge base 206 does include answers for queries related to this topic ("Who resides at property . . . ?") for Entities B and C, as well as answers for queries related to the other topic ("Who purchased property . . . ?") for Entities A, B, and C. That is, the Q/A system knowledge base 206 includes Answer A' ("Entity A purchased property A"), but does not include an answer to the query "Who resides at property A", as indicated by the "Null" entry in column 208.

Using the information found in Q/A system knowledge base 206, the Q/A system 202 and/or table builder 222 recognize a correlation pattern between Answer B (e.g., "Entity B resides at property B") and answer B' (e.g., "Entity B purchased property B"), as well as the correlation pattern between Answer C (e.g., "Entity C resides at property C") and answer C' (e.g., "Entity C purchased property C"). As such, Q/A system 202 and/or table builder 222 utilizes this correlation pattern to determine that the answer to Query 1 for Entity A and the answer to Query 2 for Entity A have the same correlation/relation. As such, since "Entity B" was part of the answer to the Query 1 and Query 2, and since "Entity C" was part of the answer to the Query 1 and Query 2, then the Q/A system 202 determines that "Entity A" is part of the answer to the Query 1 and Query 2. As such, the Q/A system 202 determines that the answer to Query 1 for Entity A is "Entity A resides at property A", then this answer (Answer A) populates column 216 in SAD Q/A system knowledge base 214, as well as the answers in column 218 (which correlate to the answers from column 210 in the Q/A system knowledge base 206).

Thus, the patterns/correlations of the answers to Queries 1 and 2 for Entities B and C provide the basis of the determination of the answer to Query 1 for Entity A.

Figure 3:
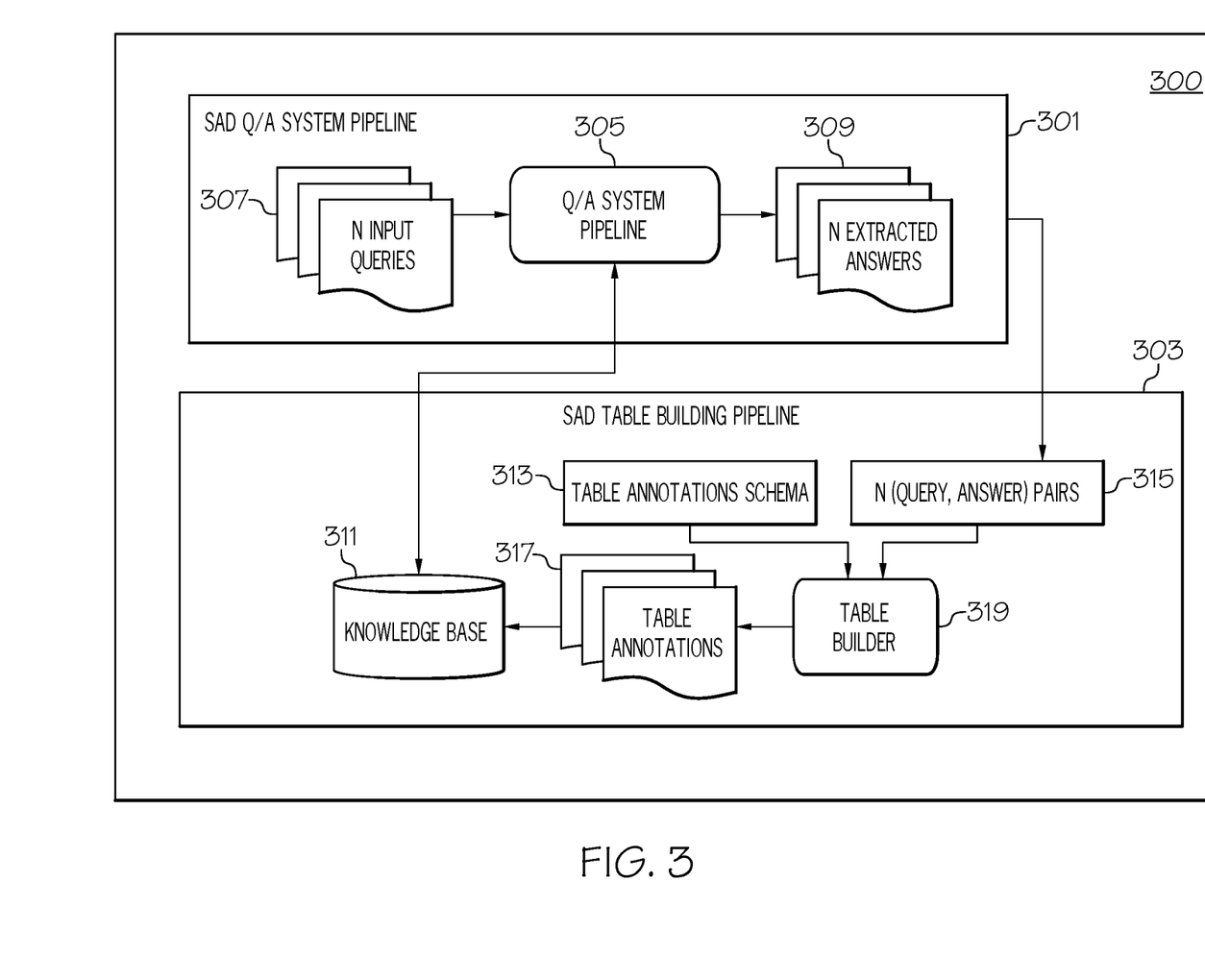
FIG. 3 depicts a high-level overview of one or more embodiments of the present invention.

With reference now to FIG. 3, a high-level overview of a Structured Answering Domain (SAD) query/answer (Q/A) system architecture 300 in accordance with one or more embodiments of the present invention is depicted. More specifically, SAD Q/A system architecture 300 structures raw text using a SAD Q/A system pipeline 301 and a SAD table building pipeline 303.

As shown in FIG. 3, within SAD Q/A system architecture 300 is a Q/A system pipeline 305, which is a system that receives a query (from the N input queries 307 that are input by a user and/or another system), and mines a knowledge base (KB) 311 to answer the query using one or more of the N extracted answers 309.

Thus, the SAD Q/A system pipeline 301 is configured to input N queries, collect their answers, and output the N (Query, Answer) pairs.

More specifically and in one or more embodiments of the present invention, the SAD Q/A system architecture 300 structures raw text using a Q/A System. The user inputs N Queries (N input queries 307) to the Q/A System (Q/A system pipeline 305), which collects the Answers (N extracted answers 309) from unstructured text (e.g., unstructured information source(s) 204 shown in FIG. 2), thus obtaining N (Query, Answer) pairs 315.

The user/system also inputs a table annotations schema 313, which describes the underlying table structure, optionally including any extra semantic information that would be relevant during table analysis. The table annotations schema 313 also includes a TableID field, which is a unique identifier for each table in the Q/A System's KB 311. The table builder uses this information to build table annotations 317, which are then stored to the Q/A System's KB 311.

Thus, an exemplary table annotation from table annotations 317 is:

--- tableID :: (ColumnID | RowID) :: annotationType :: canonicalName :: (unit) :: (auxiliary) :: [cell 1,..., cell N]

--- where:
tableID identifies the table in which a particular (Query, Answer) pair is located;
(ColumnID|RowID) is the name of the columns (ColumnID) and rows (RowID) in that table;
annotationType describes what type of annotations (e.g., #, @, $, etc.) are used to identify data entry types;
canonicalName is name of a resource record (e.g., in a Domain Name System—DMS) that maps one domain name to another, including the aliases of the true (canonical) name of the resource;
(unit) is a name of a current project (job) within which database transactions (such as the creation of the KB 311 shown in FIG. 3) are shared;
(auxiliary) describes supporting resources used by the SAD Q/A system architecture 300; and
[cell 1, . . . , cell N] identifies the N extracted answers 309 that populate the SAD Q/A system knowledge base 214 shown in FIG. 2.

Thus, for each table of N records, the user/system inputs N queries and collects the corresponding N answers. For each set of N (Query, Answer) pairs, the user/system assigns a table annotations schema, which describes how these N (Query, Answer) pairs are to be represented within the table (what header, what annotation type, what column or row number, etc.), as well as the TableID field to which table these go to. This process repeats for each new header with its corresponding cells data needed to be added to the table, until the table is complete. The table builder (and/or SAD Q/A system pipeline) reads the output package containing this data and builds the corresponding table annotations, which contains table annotations schema to identify the headers from the query as well as the corresponding cells data from both the query and the answer. The system also uses the TableID field provided in the schema to know to which table these annotations go to. The table annotations are then used to build a new table or update an existing one in the Q/A system's knowledge base.

Returning to FIG. 2, in an embodiment of the present invention the answers extracted from the unstructured information source(s) 204 by the Q/A system 202 and/or the table builder 222 include information about actions to be taken in response to certain answers to Query 1 and Query 2.

For example, assume again that if Entity A is residing in property A (Answer A shown in SAD Q/A system knowledge base 214), then an access gate to property A is unlocked in response to an identification card for Entity A being swiped through a card reader on the access gate (Action X shown in column 220).

As shown in Q/A system knowledge base 206, there is no Answer A, since it was not answered by the Q/A system 202 when the Q/A system 202 accessed the unstructured information source(s) 204. As such, the access gate is not allowed to be opened when Entity A swipes his/her ID card through the card reader for the access gate.

However, SAD Q/A system knowledge base 214 does have Answer A (using the process described above). As such, when the Q/A system 202 accesses the SAD Q/A system knowledge base 214, it sees that Entity A is residing at property A ("Answer A"), and thus has the instruction "Allow" in column 220, which the Q/A system 202 interprets as an instruction to open the access gate when Entity A swipes his/her access card across the card reader. That is, computer 102 (analogous to Q/A system 202) reads the "Allow" instruction in column 220, resulting in computer 102 causing the remote device 154 (e.g., the access gate and/or its controller) to be activated, thus opening the access gate when the Entity A swipes his/her access card by the gate controller.

In one or more embodiments, the present invention uses an electronic neural network, such as the neural network 124 shown in FIG. 1, to identify correlations between answers, determine if a physical action is to be performed, etc. In various embodiments of the present invention, the neural network 124 shown in FIG. 1 is a Non-Convolutional Neural Network, a Convolutional Neural Network (CNN), and/or another type of machine learning system. In a preferred embodiment, a Non-Convolutional Neural Network is used to evaluate text/numeric data in a user utterance, while a CNN is used to evaluate an image provided by a user in a comment, query, etc. that is the user's utterance.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a NN, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

Figure 4:
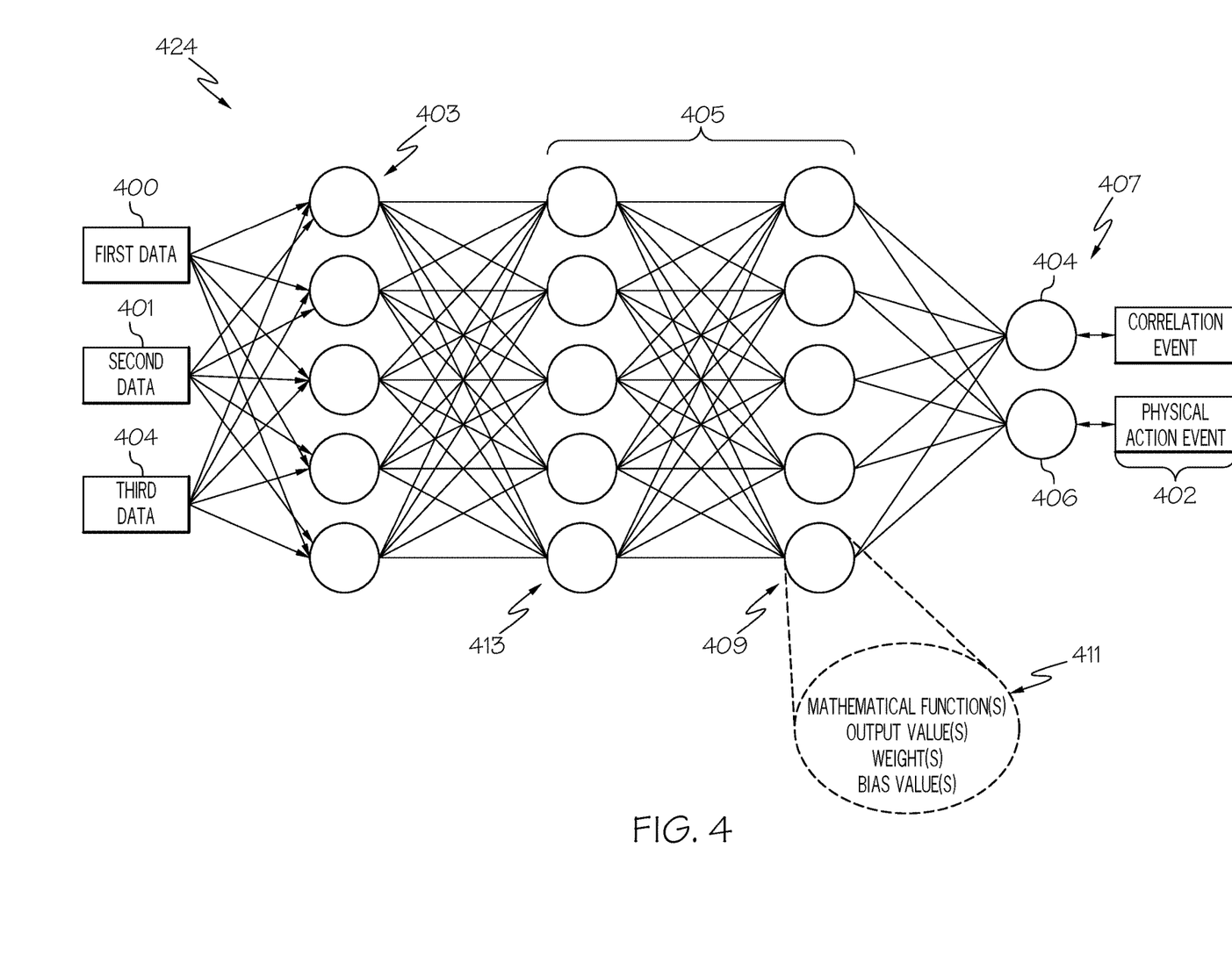
FIG. 4 depicts an exemplary neural network as used in one or more embodiments of the present invention.

With reference now to FIG. 4, a Neural Network (NN) 424 used to evaluate textual data in one or more embodiments of the present invention is presented. For example, assume, for illustrative purposes, that Answer B shown in FIG. 2 includes the text "Entity B", "resides" and "Property B", and that these terms ("Entity B", "resides", "Property B") are found in box 400. Assume further that Answer B' shown in FIG. 2 includes the text "Entity B", "purchased", and "Property B", and that these terms ("Entity B", "purchased", and "Property B") are found in box 401. As such, the data from box 400 and box 401 are entered into the input layer 403 of the neural network 424.

As shown in FIG. 4, the electronic neurons in NN 424 are arranged in layers, known as the input layer 403, hidden layers 405, and an output layer 407. The input layer 403 includes neurons/nodes that take input data, and send it to a series of hidden layers of neurons (e.g., hidden layers 405), in which neurons from one layer in the hidden layers are interconnected with all neurons in a next layer in the hidden layers 405. The final layer in the hidden layers 405 then outputs a computational result to the output layer 407, which is often a single node for holding vector information. In an embodiment of the present invention, each neuron in the output layer 407 is associated with a particular response label from response labels 402, as shown in FIG. 4.

As just mentioned, each node in the depicted NN 324 represents an electronic neuron, such as the depicted neuron 409. As shown in block 411, each neuron (including neuron 409) includes at least four features: a mathematical function, an output value, a weight, and a bias value.

The mathematical function is a mathematic formula for processing data from one or more upstream neurons. For example, assume that one or more of the neurons depicted in the middle hidden layers 405 send data values to neuron 409. Neuron 409 then processes these data values by executing the mathematical function shown in block 411, in order to create one or more output values, which are then sent to another neuron, such as another neuron within the hidden layers 405 or a neuron in the output layer 407. Each neuron also has a weight that is specific for that neuron and/or for other connected neurons. Furthermore, the output value(s) are added to bias value(s), which increase or decrease the output value, allowing the NN 424 to be further "fine tuned".

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, and/or increased by the bias value, thus causing the mathematical function (s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the mathematical function in the neuron 413. Alternatively, the output of neuron 409 can be minimized by decreasing the weight and/or bias used to affect the output of neuron 409. These weights/biases are adjustable for one, some, or all of the neurons in the NN 424, such that a reliable output will result from output layer 407. Such adjustments are alternatively performed manually or automatically.

When manually adjusted, the weights and/or biases are adjusted by the user in a repeated manner until the output from output layer 407 matches expectations. For example, assume that input layer 403 receives inputs from box 400 that describes how the user approved of answer A1 for utterance U1. Assume further that input layer 403 receives inputs from box 401 that describes the same user approving of answer A1 for utterance U2. If NN 424 has been properly trained (by manually adjusting the mathematical function(s), output value(s), weight(s), and biases in one or more of the electronic neurons within NN 424) it outputs a correct output vector to the output layer 407.

When automatically adjusted, the weights (and/or mathematical functions) are adjusted using "back propagation", in which weight values of the neurons are adjusted by using a "gradient descent" method that determines which direction each weight value should be adjusted to. For example, if the output from neuron 404 is just 0.5, then the output from neuron 404 is manually changed to a high value (e.g., 0.9). The back-propagation gradient descent process moves the weight and/or bias in each neuron in the input layer 403 and/or hidden layers 405 in a certain direction until the output from output layer 407 improves (e.g., the value in node 404 gets closer to 0.9).

Thus, a properly trained NN 424 will output a value from neuron 404 that is higher than a predetermined value (e.g., 0.9) when there is a correlation between answer data found in box 400 and answer data found in box 401. That is, NN 424 is trained to put a value greater than 0.9 onto node 404 whenever there is overlapping input data found in box 400 and box 401. For example, assume that box 400 includes text data ("Entity B", "resides", "Property B") from Answer B shown in FIG. 2, and box 401 includes text data ("Entity B", "purchased", "Property B") from Answer B' shown in FIG. 2. As such, the NN 424 is trained to recognize that since "Entity B" and "Property B" are both of box 400 and box 401, then there is a correlation between "resides" and "purchased", even for other entities (e.g., Entity A) and properties (e.g., Property A). Thus, when just data for Answer A' ("Entity A", "purchased", and "Property B") is input from box 401 alone, the NN 424 is trained to output a correlation between "purchased" and "resides" to node 404, indicating this correlation event shown in the event labels 402.

Once the NN 424 is trained to recognize a correlation between the data found in box 400 and box 401, it can also be trained to recognize third data from box 404, which describes an action. For example, assume that the third data in box 404 is identification information from an access control device for an access gate to Property A described above. As such, the NN 424, which has been trained to recognize the correlation between the ownership ("purchased") and residence ("resides") of Entity A on Property A will also recognize that Entity A is authorized to activate the access controller for the access gate to Property A. As such, NN 424 is trained to output a value (e.g., greater than 0.9) to node 406, which causes a signal to be sent to the access controller to open the access gate, as shown in the label "Physical action event" in the event labels 402.

A CNN is similar to a NN in that both utilize interconnected electronic neurons. However, a CNN is different from a NN in that 1) a CNN has neural layers whose sizes are based on filter sizes, stride values, padding values, etc., and 2) a CNN utilizes a convolution scheme to analyze image data. A CNN gets its "convolutional" name based on a convolution (i.e., a mathematical operation on two functions to obtain a result) of filtering and pooling pixel data (a mathematical operation on two functions) in order to generate a predicted output (obtain a result).

While the data and examples described above are for persons, in other embodiments of the present invention such data is for non-persons.

For example, assume that the first data in box 400 and the second data in box 401 and the third data in box 404 are all for a same pump in a refinery. Assume further, for purposes of illustration, that the first data in box 400 includes the terms "Pump B", "overheating", and "decreased output", which are part of an Answer B' to a Query 2 ("How hot is Pump B?") for a Pump B in a refinery. Assume further that the second data in box 401 includes the terms "Pump B", "more than 1200 rpms", and "decreased output", which are part of an Answer B to Query 1 ("How fast is Pump B rotating?") for Pump B. As such, there is a correlation between Answer B and Answer B' for the Pump B since both answers include "Pump B" and "decreased output"; this correlation is that "overheating" is related to "more than 1200 rpms". As such, if a pressure reading (e.g., third data found in box 404) is entered into the NN 424 indicating that the pressure level in Pump B has exceeded a certain level, then the NN 424 has been trained to shut down Pump B.

Assume further that Answer A' for Query 2 ("How hot is Pump A") for Pump A includes the terms "Pump A", "overheating", and "decreased output". Assume further that the Q/A system 202 is unable to obtain an answer for Query 1 ("How fast is Pump A rotating") from the unstructured information sources 204. Nonetheless, NN 424 has been trained to correlate "overheating" with "decreased output" for Pump A. As such, if a pressure reading (e.g., third data found in box 404) is entered into the NN 424 indicating that the pressure level in Pump A has exceeded a certain level, then the NN 424 has been trained to shut down Pump A.

Figure 5:
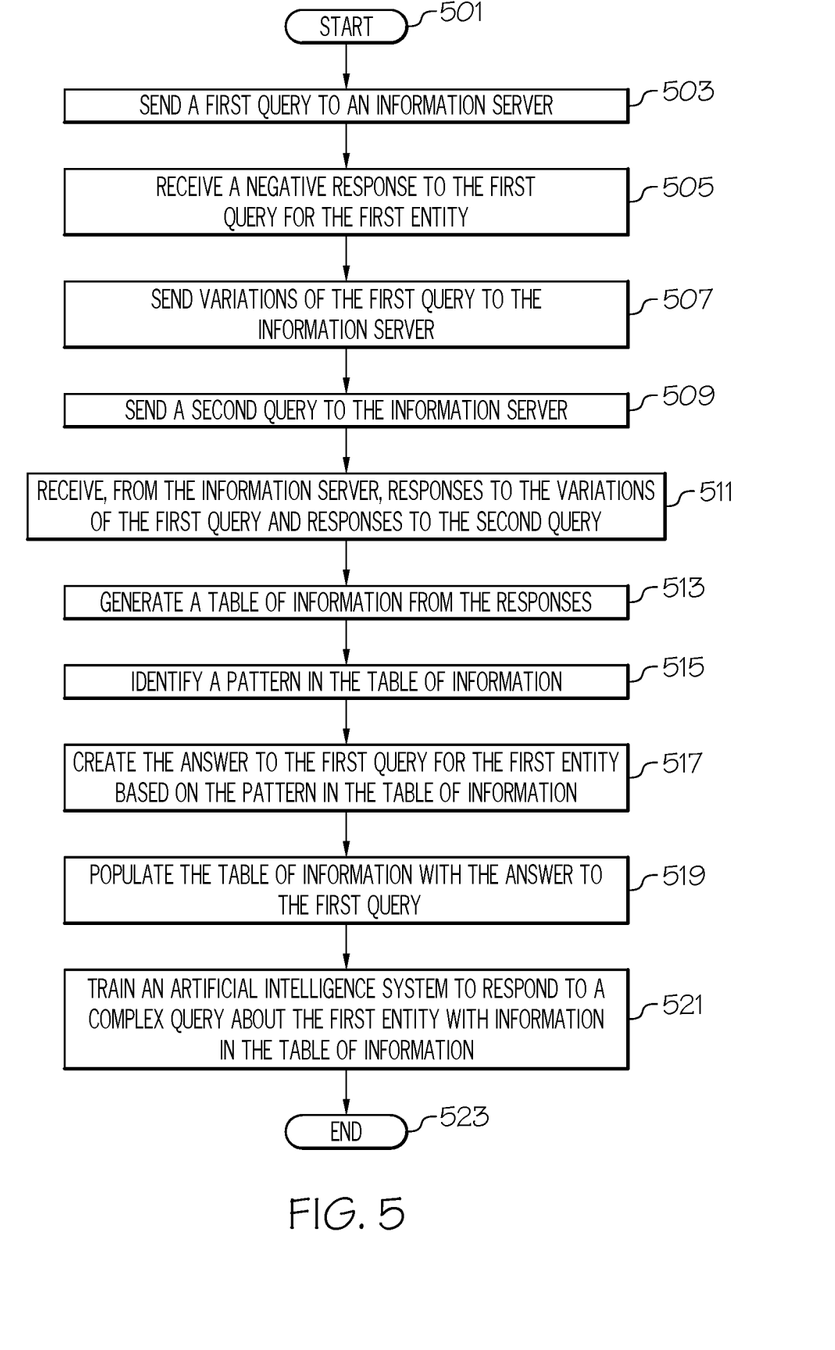
FIG. 5 is a high-level flow chart of one or more steps performed in accordance with one or more embodiments of the present invention.

With reference now to FIG. 5, a high-level flow chart of one or more embodiments of the present invention is presented.

After initiator block 501, a query/answer system (e.g., Q/A system 202 shown in FIG. 2) sends a first query to an information server (e.g., one of the information server(s) 252 shown in FIG. 2), as described in block 503. As described herein, the first query is a query about a first topic (e.g., "residing in a property") with regard to a first entity (e.g., Entity A). Furthermore, and as described herein, the information server provides access to unstructured information sources (e.g., text documents, web pages, etc.)

As described in block 505, the query/answer system receives a negative response to the first query for the first entity. This negative response indicates that the unstructured information sources do not explicitly contain an answer to the first query for the first entity. In response to receiving the negative response to the first query for the first entity, the query/answer system performs the processes shown in block 507 and block 509.

As shown in block 507, the query/answer system sends variations of the first query to the information server. The variations of the first query are about the first topic but with regard to other entities, and the other entities do not include the first entity. In the example described above, the illustrative topic is about "where an entity is residing". The query "Where is Entity A residing?" could not be answered from data in the unstructured information source(s) 204 for Entity A. The variations of this query are thus "Where is Entity B residing?" and/or "Where is Entity C residing?".

As shown in block 509, the query/answer system sends a second query to the information server. The second query is about a second topic (e.g., "what property an entity has purchased") regarding both the first entity and the other entities to the information server. That is, the query/answer system asks this query (e.g., "What property has Entity X purchased?") for not only Entity A, but also for Entity B and/or Entity C.

As shown in block 511, the query/answer system receives, from the information server, responses to the variations of the first query (e.g., "Where is Entity B residing?") and responses to the second query (e.g., "What property has Entity X purchased?").

As shown in block 513, the query/answer system then generates a table of information (e.g., Q/A system knowledge base 206 shown in FIG. 2) from the responses to the variations of the first query and the responses to the second query.

As shown in block 515, the query/answer system identifies a pattern in the table of information between the responses to the variations of the first query and the responses to the second query for the other entities.

As described in block 517, the query/answer system then creates the answer to the first query for the first entity (e.g., Answer A shown in FIG. 2) based on the pattern in the table of information between the responses to the variations of the first query and the responses to the second query for the other entities.

As described in block 519, the query/answer system populates the table of information with the answer to the first query to create the SAD Q/A system knowledge base 214 shown in FIG. 2.

As described in block 521, the query/answer system then trains an artificial intelligence system (e.g., neural network 124 shown in FIG. 1 and/or neural network 424 shown in FIG. 4) to respond to a complex query about the first entity with information in the table of information that is populated with the answer to the first query, wherein the complex query requests responses to multiple queries about the first entity.

For example, assume that the complex query is "Where does Entity A live, what property has Entity A purchased, and should Entity A be allowed to enter Property A?" Such a complex (multi-part) query cannot be answered by a traditional Q/A system data mining unstructured information sources, since these sources are 1) unable to answer the first part of the query for reasons described above, and 2) do not have the cognitive ability of the artificial intelligence system to know whether or not Entity A should be allowed to enter Property A. However, the present invention enables all of these queries/actions to be answered/performed.

The flow chart ends at terminator block 523.

In an embodiment of the present invention, the query/answer system thus responds to a query (e.g., "Where does Entity A live?") with Answer A, which has been developed using the process described herein. If this same query arrives later, then the query/answer system will reuse the (SAD) Q/A system knowledge base 214. However, if the (SAD) Q/A system knowledge base 214 is no longer available (e.g., has been deleted), then the query/answer system will reconstruct the (SAD) Q/A system knowledge base 214 using the process described herein.

In an embodiment of the present invention, the artificial intelligence system is a neural network (see FIG. 4).

In an embodiment of the invention in which a neural network is used, the system (e.g., computer 102) and/or a user trains the neural network to generate the table of information from the responses to the variations of the first query and the responses to second query for the other entities, as described above when training the neural network 424 in FIG. 4.

In an embodiment of the present invention in which a neural network is used and the complex response includes controlling a physical device (see column 220 in FIG. 2), the system (e.g., computer 102) and/or a user trains the neural network to direct one or more processors to control the physical device. For example, the physical action event shown in the event labels 402 describes the neural network 424 directing a processor in the gate access control device to open up the access gate to the property where the Entity A lives.

In an embodiment of the present invention in which the complex response includes controlling a physical device, the method further includes training the neural network to direct one or more processors to change a functionality of the physical device. For example, and as described above, the neural network is trained to turn off a pump if it overpressurizes.

In an embodiment of the present invention, a response to the first query is dependent upon a response to the second query. For example, for a pump to overheat, it must first run too fast. However, there might or might not be a requirement that a person must first purchase a property before living in it. However, the present invention contemplates either scenario (in which Answer X' (A', B', C') is a prerequisite for Answer X (A, B, C), as shown in FIG. 2.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
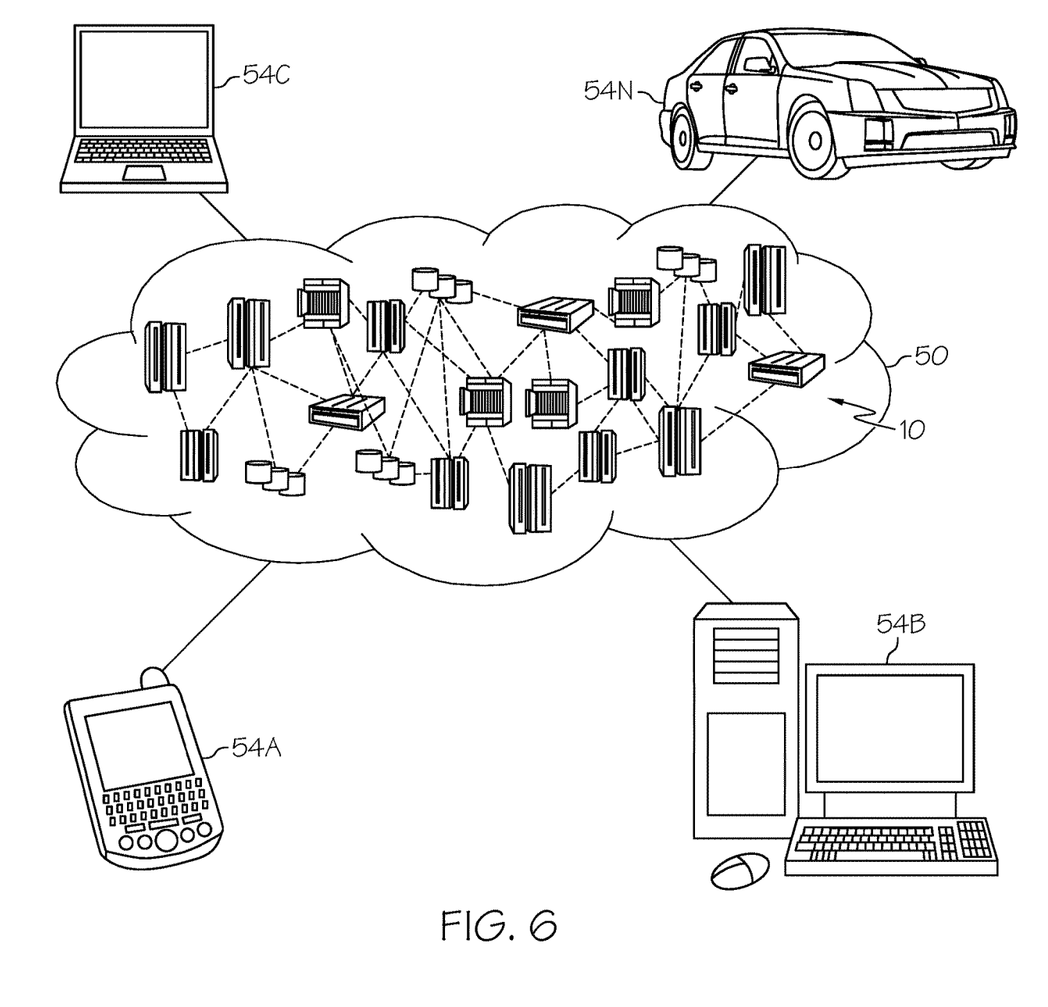
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
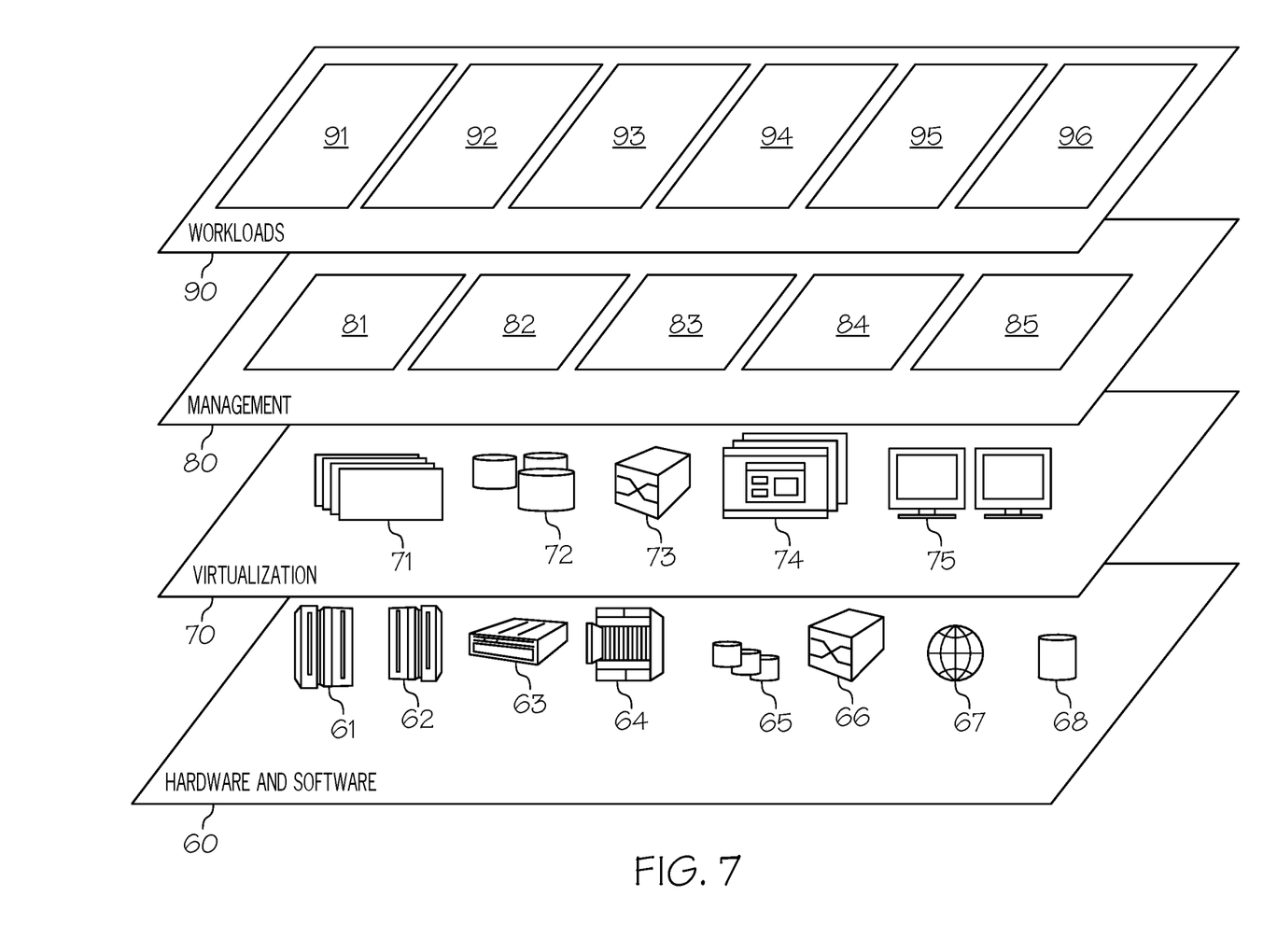
FIG. 7 depicts abstraction model layers of a cloud computer environment according to an embodiment of the present invention.

Referring now to FIG. 7, a set of functional abstraction layers provided by cloud computing environment 50 (FIG.

6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and neural network training processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
sending, by a query/answer system, a first query to an information server, wherein the first query is a query about a first topic with regard to a first entity, and wherein the information server provides access to unstructured information sources;
receiving, by the query/answer system, a negative response to the first query for the first entity, wherein the negative response indicates that the unstructured information sources do not explicitly contain an answer to the first query for the first entity;
in response to receiving the negative response to the first query for the first entity:
  sending, by the query/answer system, variations of the first query to the information server, wherein the variations of the first query are about the first topic with regard to other entities, and wherein the other entities do not include the first entity; and
  sending, by the query/answer system, a second query to the information server, wherein the second query is about a second topic regarding both the first entity and the other entities;
receiving, by the query/answer system and from the information server, responses to the variations of the first query and responses to the second query;
generating, by the query/answer system, a table of information from the responses to the variations of the first query and the responses to the second query;
identifying, by the query/answer system, a pattern in the table of information between the responses to the variations of the first query and the responses to the second query for the other entities;
creating, by the query/answer system, the answer to the first query for the first entity based on the pattern in the table of information between the responses to the variations of the first query and the responses to the second query for the other entities;
populating, by the query/answer system, the table of information with the answer to the first query; and training, by the query/answer system, an artificial intelligence system to respond to a complex query about the first entity with information in the table of information that is populated with the answer to the first query, wherein the complex query requests responses to multiple queries about the first entity.

2. The method of claim 1, wherein the artificial intelligence system is a neural network.

3. The method of claim 2, further comprising:
training the neural network to generate the table of information from the responses to the variations of the first query and the responses to the second query for the other entities.

4. The method of claim 2, wherein the complex response includes controlling a physical device, and wherein the method further comprises:
training the neural network to direct one or more processors to control the physical device.

5. The method of claim 2, wherein the complex response includes controlling a physical device, and wherein the method further comprises:
training the neural network to direct one or more processors to change a functionality of the physical device.

6. The method of claim 1, wherein a response to the first query is dependent upon a response to the second query.

7. A computer program product comprising a computer readable storage medium having program code embodied therewith, wherein the computer readable storage medium is not a transitory signal per se, and wherein the program code is readable and executable by a processor to perform a method comprising:
sending a first query to an information server, wherein the first query is a query about a first topic with regard to a first entity, and wherein the information server provides access to unstructured information sources;
receiving a negative response to the first query for the first entity, wherein the negative response indicates that the unstructured information sources do not explicitly contain an answer to the first query for the first entity;
in response to receiving the negative response to the first query for the first entity:
sending variations of the first query to the information server, wherein the variations of the first query are about the first topic with regard to other entities, and wherein the other entities do not include the first entity; and
sending a second query to the information server, wherein the second query is about a second topic regarding both the first entity and the other entities;
receiving, from the information server, responses to the variations of the first query and responses to the second query;
generating a table of information from the responses to the variations of the first query and the responses to the second query;
identifying a pattern in the table of information between the responses to the variations of the first query and the responses to the second query for the other entities;
creating the answer to the first query for the first entity based on the pattern in the table of information between the responses to the variations of the first query and the responses to the second query for the other entities;
populating the table of information with the answer to the first query; and
training an artificial intelligence system to respond to a complex query about the first entity with information in the table of information that is populated with the answer to the first query, wherein the complex query requests responses to multiple queries about the first entity.

8. The computer program product of claim 7, wherein the artificial intelligence system is a neural network.

9. The computer program product of claim 8, wherein the method further comprises:
training the neural network to generate the table of information from the responses to the variations of the first query and the responses to the second query for the other entities.

10. The computer program product of claim 8, wherein the complex response includes controlling a physical device, and wherein the method further comprises:
training the neural network to control the physical device.

11. The computer program product of claim 8, wherein the complex response includes controlling a physical device, and wherein the method further comprises:
training the neural network to change a functionality of the physical device.

12. The computer program product of claim 7, wherein a response to the first query is dependent upon a response to the second query.

13. The computer program product of claim 7, wherein the program code is provided as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
sending a first query to an information server, wherein the first query is a query about a first topic with regard to a first entity, and wherein the information server provides access to unstructured information sources;
receiving a negative response to the first query for the first entity, wherein the negative response indicates that the unstructured information sources do not explicitly contain an answer to the first query for the first entity;
in response to receiving the negative response to the first query for the first entity:
sending variations of the first query to the information server, wherein the variations of the first query are about the first topic with regard to other entities, and wherein the other entities do not include the first entity; and
sending a second query to the information server, wherein the second query is about a second topic regarding both the first entity and the other entities;
receiving, from the information server, responses to the variations of the first query and responses to the second query;
generating a table of information from the responses to the variations of the first query and the responses to the second query;
identifying a pattern in the table of information between the responses to the variations of the first query and the responses to the second query for the other entities;
creating the answer to the first query for the first entity based on the pattern in the table of information between the responses to the variations of the first query and the responses to the second query for the other entities;

populating the table of information with the answer to the first query; and training an artificial intelligence system to respond to a complex query about the first entity with information in the table of information that is populated with the answer to the first query, wherein the complex query requests responses to multiple queries about the first entity.

15. The computer system of claim 14, wherein the artificial intelligence system is a neural network.

16. The computer system of claim 15, wherein the method further comprises:

training the neural network to generate the table of information from the responses to the variations of the first query and the responses to the second query for the other entities.

17. The computer system of claim 15, wherein the complex response includes controlling a physical device, and wherein the method further comprises:

training the neural network to control the physical device.

18. The computer system of claim 15, wherein the complex response includes controlling a physical device, and wherein the method further comprises:

training the neural network to change a functionality of the physical device.

19. The computer program product of claim 14, wherein a response to the first query is dependent upon a response to the second query.

20. The computer system of claim 14, wherein the stored program instructions are provided as a service in a cloud environment.

* * * * *